(12) United States Patent
Kuehn et al.

(10) Patent No.: US 8,977,508 B2
(45) Date of Patent: Mar. 10, 2015

(54) METHOD AND SYSTEM FOR DETERMINING A FORCE ACTING ON A BODY

(75) Inventors: Winfried Kuehn, Delmenhorst (DE); Klaus-Peter Neitzke, Bremen (DE); Andreas Schroeder, Goettingen (DE); Eric Wilhelmus Maria Roosenboom, Goettingen (DE)

(73) Assignee: Airbus Operations GmbH, Hamburg (DE)

( * ) Notice: Subject to any disclaimer, the term of this patent is extended or adjusted under 35 U.S.C. 154(b) by 1125 days.

(21) Appl. No.: 12/965,325

(22) Filed: Dec. 10, 2010

(65) Prior Publication Data

US 2011/0172935 A1 Jul. 14, 2011

Related U.S. Application Data

(63) Continuation of application No. PCT/EP2009/057442, filed on Jun. 16, 2009.

(60) Provisional application No. 61/132,175, filed on Jun. 16, 2008.

(30) Foreign Application Priority Data

Jun. 16, 2008 (DE) .................. 10 2008 002 448

(51) Int. Cl.
*G01F 1/00* (2006.01)
*G06G 7/50* (2006.01)
*G01M 9/06* (2006.01)
*G01L 5/16* (2006.01)
*G01P 5/00* (2006.01)

(52) U.S. Cl.
CPC ............. *G01M 9/067* (2013.01); *G01L 5/16* (2013.01); *G01M 9/065* (2013.01); *G01P 5/001* (2013.01)

USPC ................................. 702/47; 703/9

(58) Field of Classification Search
USPC ........... 702/47, 33, 40–41, 49, 127, 138–140, 702/189; 703/1–2, 4, 7, 9
See application file for complete search history.

(56) References Cited

U.S. PATENT DOCUMENTS 6,549,274 B1 4/2003 Arndt et al. .................. 356/28

FOREIGN PATENT DOCUMENTS

DE 199 63 393 C1 7/2001

OTHER PUBLICATIONS

Kurtulus et al., Unsteady Aerodynamic Forces Estimation on a Square Cylinder by TR-PIV, Nov. 21, 2006 (Online Published), Exp Fluids, vol. 42, pp. 185-196.*

(Continued)

*Primary Examiner* — Toan Le
(74) *Attorney, Agent, or Firm* — Jenkins, Wilson, Taylor & Hunt, P.A.

(57) ABSTRACT

The present invention provides a method and a system for determining forces which act on a body with a controlled volume which is provided inside the flow tunnel and in which the body is arranged. A first measuring means is used to measure a pressure distribution for each surface defining the controlled volume. A second measuring means measures a velocity field for each defining surface of the controlled volume. Furthermore, a calculation unit is provided for calculating the forces acting on the body as a function of the pressure distributions and velocity fields measured for the defining surfaces of the controlled volume.

17 Claims, 3 Drawing Sheets

(56) References Cited

OTHER PUBLICATIONS

Fujisawa et al., Evaluation of Pressure Field and Fluid Forces on a Circular Cylinder With and Without Rotational Oscillation Using Velocity Data from PIV Measurement, 2005, Measurement Science and Technology 16, pp. 989-996.*

Chinese Office Action for Appl. No. 200980122676.5 dated Feb. 17, 2012.

German Office Action from DE 10 2008 002 448 dated Mar. 13, 2009.

International Search Report for PCT/EP2009/057442 dated Nov. 19, 2009.

Van Oudheusden et al., "Evaluation of integral forces and pressure fields from planar velocimetry data for incompressible and compressible flows," *Exp. Fluids*, vol. 43, pp. 153-162 (2007).

* cited by examiner

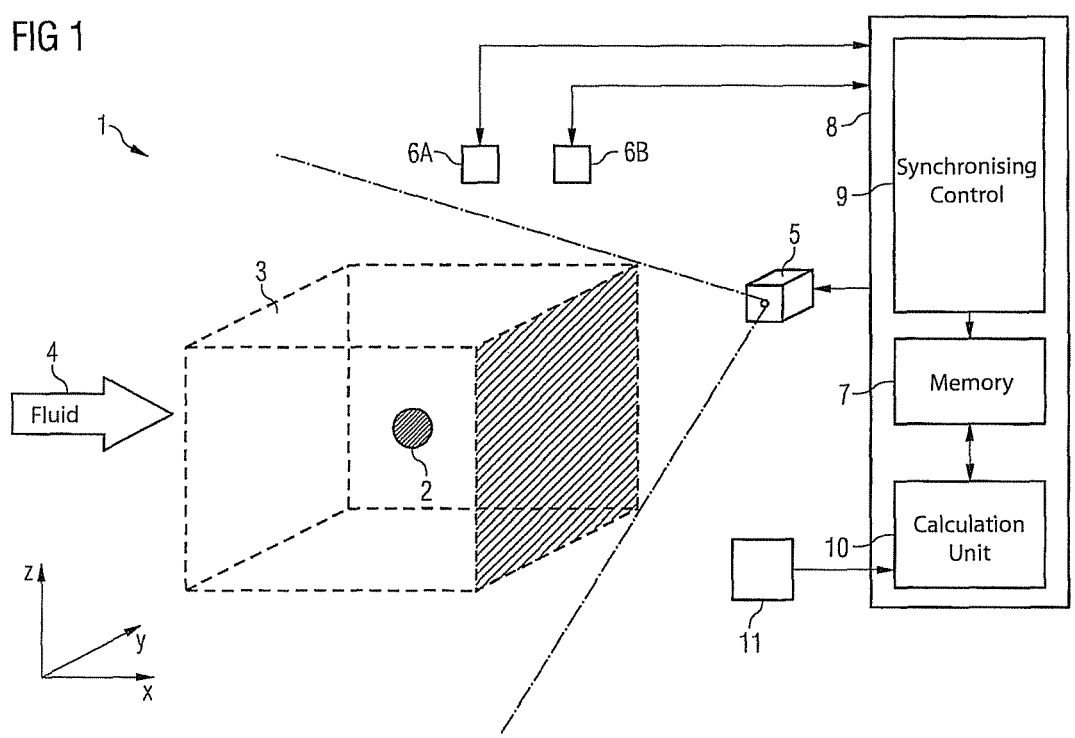

FIG 2A
FIG 2B
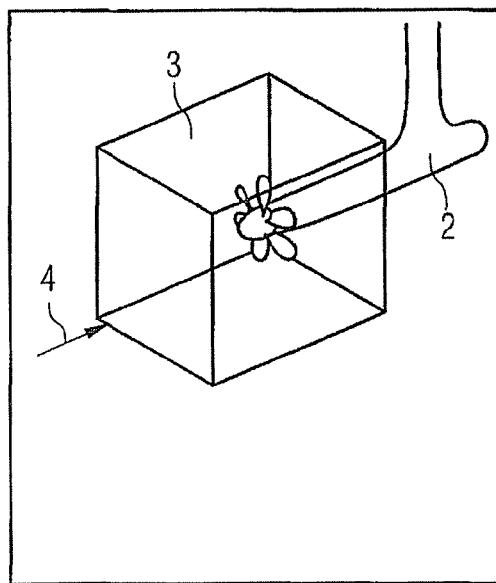
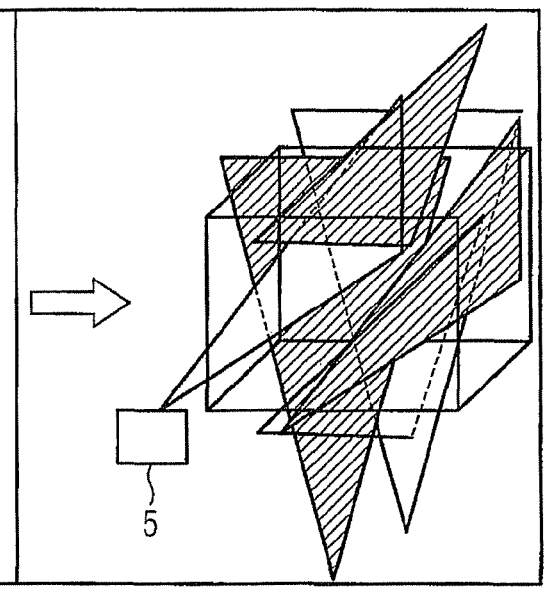

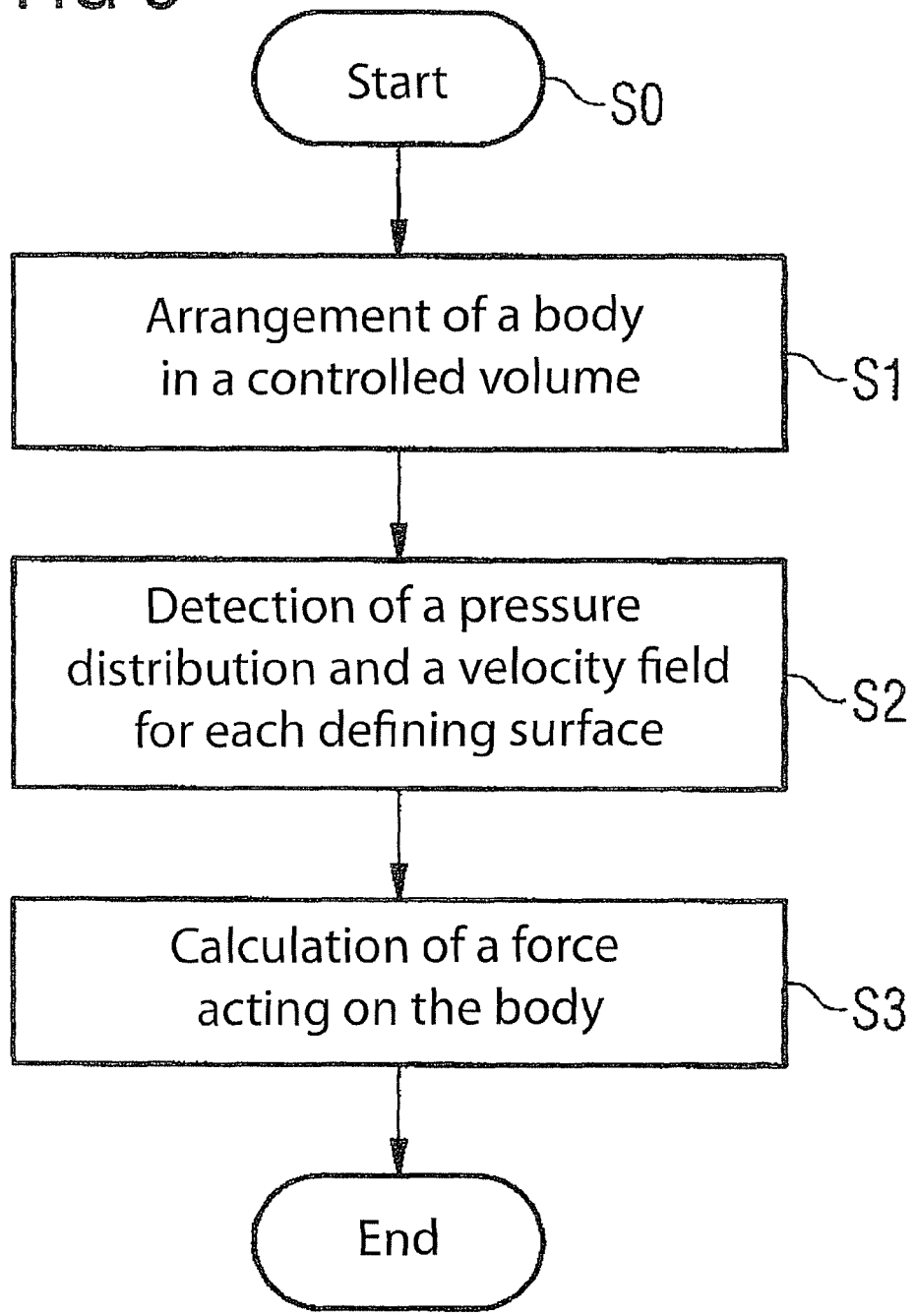

METHOD AND SYSTEM FOR DETERMINING A FORCE ACTING ON A BODY

CROSS-REFERENCE TO RELATED APPLICATIONS

This application is a continuation of PCT/EP2009/057442 filed Jun. 16, 2009 and claims the benefit of U.S. Provisional Application No. 61/132,175, filed Jun. 16, 2008 and German Patent Application No. 10 2008 002 448.1, filed Jun. 16, 2008, the entire disclosures of which are herein incorporated by reference.

BACKGROUND

In order to investigate the aerodynamic and aeroacoustic characteristics of objects, said objects or true-to-scale three-dimensional models of the objects to be investigated are placed in a wind tunnel or flow tunnel. For example, models of aircraft or other vehicles are arranged in a flow tunnel and exposed to a flow of a fluid, for example a flow of air. Apart from investigating models of vehicles, a flow tunnel can also be used for investigating buildings. In this respect, a three-dimensional model of a building, for example a multi-storey building or a bridge, is arranged in the wind tunnel and exposed to an air flow.

Due to the restricted diameter of a flow tunnel, it is rare for objects to be investigated in their original size in the flow tunnel. For this reason, true-to-scale, three-dimensional models are usually made of large objects and arranged in the flow tunnel to investigate the flow behaviour of the object.

For bodies, in particular aircraft, it is important when investigating the aerodynamic behaviour thereof to detect the forces which act on the body in order to be able to verify characteristics of the body or to be able to make improvements to components or to the structure of the body.

In conventional measuring systems, the forces acting on the body are measured statically, for example by means of so-called wind tunnel balances. In measuring systems of this type, the force is measured directly by the wind tunnel balances, averages of the forces acting on the body being measured by the wind tunnel balance.

These conventional systems for determining a force acting on a body suffer from various disadvantages. On the one hand, the wind tunnel balance only measures averages of the force acting on the body and does not measure any time behaviour, i.e. only a static force measurement is made, not a dynamic force measurement. Furthermore, a conventional system for determining a force using a wind tunnel balance is not suitable for some components or parts of a body. To measure forces which act on a rotating body of an aircraft, for example on a propeller, a wind tunnel balance has to be fitted to the rotating component or rotating part. This can only be achieved with considerable technical complexity. Furthermore, the centrifugal forces which arise during rotation falsify the measurement result.

SUMMARY

Therefore, it is an object of the present invention to provide a method and device which, with relatively low technical complexity, precisely detects the forces acting on any desired body.

This object is achieved according to the invention by a method which has the features stated in the following. The invention provides a method for determining forces acting on a body with the following steps:

(a) arranging the body in a predetermined controlled volume inside a flow tunnel;
(b) measuring a pressure distribution and a velocity field for each surface defining the controlled volume;
(c) calculating the forces acting on the body as a function of the pressure distributions and velocity fields measured for the defining surfaces of the controlled volume.

In an embodiment of the method according to the invention, the velocity fields for the defining surfaces of the controlled volume are measured optically.

Optical detection of a velocity field affords the advantage that during the measurement, the flow acting on the body is not affected by the measurement.

A further advantage is that the geometry and size of the controlled volume can be easily adapted in a flexible manner to the spatial dimensions of the body to be investigated.

In an embodiment of the method according to the invention, the body is exposed in the flow tunnel to a flow of a fluid which contains scattered particles.

In an embodiment of the method according to the invention, by means of laser light a respective laser intersection is detected for the defining surfaces of the controlled volume for the detection of a particle distribution of the scattered particles on the respective defining surface.

In an embodiment of the method according to the invention, the laser light is generated by a pulsed laser.

In an embodiment of the method according to the invention, the particle distribution of the scattered particles is recorded by at least two cameras.

In an embodiment of the method according to the invention, the particle distributions recorded by the cameras are temporarily stored as images in a memory.

In an embodiment of the method according to the invention, the pressure distributions for the defining surfaces of the controlled volume are measured by at least one pressure sensor which can be freely moved on one or more of the defining surfaces.

In an embodiment of the method according to the invention, a local particle displacement vector is calculated by cross correlation of the detected particle distributions.

In an embodiment of the method according to the invention, a velocity vector of the velocity field is calculated on the basis of the particle displacement vectors.

In an embodiment of the method according to the invention, a force F or force distribution acting on the body is calculated as follows:

$$F = \oiint_S (\rho \overline{V} \cdot d\overline{S})\overline{V} + \oiint_S p \, d\overline{S}$$

wherein
V is a velocity vector,
S is a defining surface of the controlled volume,
p is a detected pressure, and
ρ is the density of the flow fluid.

In an embodiment of the method according to the invention, the controlled volume is formed by a cube or cuboid with six defining surfaces.

In an embodiment of the method according to the invention, the defining surfaces of the controlled volume run orthogonally relative to one another.

This has the advantage that the data detected at the defining surfaces can be evaluated without converting the coordinates.

In an alternative embodiment of the method according to the invention, the controlled volume is formed by a tetrahedron with four defining surfaces.

A tetrahedron as the controlled volume has the advantage that the number of defining surfaces to be evaluated is minimal.

In an embodiment of the method according to the invention, the time characteristic of the force F(t) or the force distribution acting on the body is determined dynamically as a function of the current pressure distributions and velocity fields.

The invention also provides a system with the following features.

The invention provides a system for determining at least one force acting on a body, with:
  (a) a controlled volume which is provided inside a flow tunnel and in which the body is arranged;
  (b) a first measuring means to measure a pressure distribution for each surface defining the controlled volume;
  (c) a second measuring means to measure a velocity field for each defining surface of the controlled volume; and with
  (d) a calculation unit for calculating the force F acting on the body as a function of the pressure distributions and velocity fields measured for the defining surfaces of the controlled volume.

In an embodiment of the method according to the invention, the first measuring means comprises at least one pressure sensor which can be moved on one or more defining surfaces or delimiting planes of the controlled volume.

In an embodiment of the method according to the invention, the second measuring means produces a laser intersection for each defining surface of the controlled volume to detect a particle distribution of scattered particles on the defining surface.

In an embodiment of the system according to the invention, the second measuring means comprises at least one pulsed laser and at least two cameras.

In an embodiment of the system according to the invention, the camera is a CCD camera or a CMOS camera.

In an embodiment of the system according to the invention, the body is a three-dimensional model, the volume of which is smaller than the controlled volume.

The invention also provides a computer program with program commands for implementing a method for determining at least one force which acts on a body which is installed in a flow tunnel and over which a fluid flows, the computer program having the following steps:

Detection of a pressure distribution and a velocity field for each surface defining the controlled volume;

Calculation of the force F acting on the body as a function of the pressure distributions and velocity fields detected for the defining surfaces of the controlled volume.

The invention also provides a data carrier for storing a computer program of this type.

Preferred embodiments of the method and device according to the invention will be described in the following with reference to the accompanying figures to explain fundamental features of the invention.

BRIEF DESCRIPTION OF THE DRAWINGS

FIG. 1 shows a block diagram to illustrate a possible embodiment of a system according to the invention for determining a force acting on a body;

FIGS. 2a, 2b show diagrams to explain the system and method according to the invention for determining a force acting on a body;

FIG. 3 shows a simple flow chart to illustrate a possible embodiment of the method according to the invention for determining a force acting on a body.

DETAILED DESCRIPTION

As can be seen from FIG. 1, in a measuring system 1 according to the invention, a body 2 is positioned inside a controlled volume 3 which is provided in a flow or wind tunnel. The body 2 can be any desired body, in particular a three-dimensional model. The three-dimensional model is for example a model of an aircraft or a component of an aircraft. The body 2 can also be any other bodies to be investigated, for example a vehicle or the model of a building which is to be investigated. The body 2 to be investigated is in a controlled volume, i.e. the volume or the size of the body 2 is smaller than the controlled volume 3. The controlled volume 3 inside the flow tunnel is a closed volume and has a plurality of defining surfaces. The geometry of the controlled volume 3 can be selected as a function of the geometry of the body 2 to be investigated. The coordinates of the defining surfaces of the controlled volume are preferably stored in a memory to control measuring means. In the embodiment shown in FIG. 1, the controlled volume 3 is formed by a cube or cuboid, the defining surfaces of which are aligned orthogonally relative to one another. In an alternative embodiment, the controlled volume 3 is formed by a tetrahedron with four defining surfaces. The geometry and dimensions of the controlled volume 3 can be flexibly adapted to the shape and size of the body 2 to be investigated.

The body 2 to be investigated in the controlled volume 3 is exposed to a flow of any desired fluid 4 in the flow tunnel. The fluid 4 can be, for example, a gas or a liquid. In many cases, the flow fluid 4 is formed by air. In this case, one or more fans produce a flow of air which is directed onto the body 2.

In a preferred embodiment of the method according to the invention, scattered particles which reflect light, in particular laser light, are added to the fluid 4. In a possible embodiment, the size or diameter of the scattered particles can be varied.

In an embodiment of the measuring system 1 according to the invention, as shown in FIG. 1, a laser 5 which generates a pulsed light with an adjustable intensity is provided for each defining surface of the controlled volume 3. By means of the laser light, a respective laser intersection is detected for each defining surface of the controlled volume 3 for detecting a particle distribution of the scattered particles on the respective defining surface.

In an alternative embodiment, the number of laser light sources or lasers 5 is smaller than the number of the defining surfaces enclosing the controlled volume 3. In this embodiment, optical means, for example lenses and mirrors, are used to produce a laser intersection for each defining surface, the laser light being generated by a common laser 5. In an embodiment of the measuring system 1 according to the invention, the time period or the frequency of the pulsed laser light can be adjusted.

As shown by FIG. 1, the measuring system 1 according to the invention also comprises at least two cameras 6A, 6B which optically record the particle distribution of the scattered particles for each defining surface. The cameras 6A, 6B can be, for example, CCD (charge coupled device) cameras or CMOS cameras. The particle distributions recorded by the cameras 6A, 6B for the respective defining surface of the controlled volume 3 can be temporarily stored as images in a memory 7 of a data processing device 8. The laser 5 and the cameras 6A, 6B are controlled by a synchronising control or a synchroniser 9. The cameras 6A, 6B record a local displacement of many scattered particles which follow the flow of the fluid 4 in a drift-free manner, in that a defining surface of the controlled volume is illuminated in the flow by two very short pulses of light from the laser 5. The light pulses can last from a few nanoseconds to a few microseconds. The particle distributions recorded by the cameras 6A, 6B are stored temporarily as images in the memory 7 and are subsequently evaluated by a calculation unit 10. By cross correlating the recorded particle distributions, the calculation unit 10 calculates a local particle displacement vector. Velocity vectors V of a velocity field are calculated for each defining surface enclosing the controlled volume 3 on the basis of the particle displacement vectors. Furthermore, the calculation unit 10 receives data or measurement signals from a pressure sensor 11. In the embodiment shown in FIG. 1, the pressure sensor 11 can be moved on one or more of the defining surfaces of the controlled volume 3 and detects a pressure distribution on the respective defining surfaces of the controlled volume 3. For example, the pressure sensor 11 is moved by an activated motor in a plane corresponding to the stored coordinates of the defining surfaces of the controlled volume 3. The pressure sensor 11 measures a static pressure distribution on the defining surface in a predetermined grid of measuring points. The pressure sensor 11 constitutes a first measuring means for detecting a pressure distribution for each defining surface delimiting the controlled volume 3. The laser 5 and the associated cameras 6A, 6B constitute a second measuring means for detecting a velocity field for each defining surface of the controlled volume 3. In this respect, the second measuring means produces for each defining surface of the controlled volume 3 a laser intersection to detect the particle distribution of scattered particles on the defining surface. The resolution or the grid of the measuring points for detecting the pressure distribution and the velocity field is preferably adjustable.

The calculation unit 10 calculates the force F which acts dynamically on the body 2 as a function of the pressure distributions detected for the defining surfaces of the controlled volume 3 and as a function of the velocity vectors V on the various defining surfaces of the controlled volume 3.

In an embodiment of the system 1 according to the invention, a force F (t) which acts on the body 2 is calculated using the following equation:

$$F = \oiint_S (\rho \vec{V} \cdot d\vec{S}) \vec{V} + \oiint_S p d\vec{S}$$

wherein
V is a velocity vector,
S is a defining surface of the controlled volume 3,
p is a pressure detected on the defining surface, and
ρ is the density of the flow fluid 4.

Three forces and three torques can be determined from the velocities and pressures on the control and defining surfaces.

The calculation unit 10 can be formed, for example, by one or more microprocessors which evaluate in real time the data supplied by the measuring means and output the results via a user interface.

FIGS. 2a, 2b show simple examples to explain the method according to the invention for determining a force F acting on a body 2. In the example shown in FIG. 2a, the body 2 is a rotating body 2, in particular a propeller. This propeller 2 is in a cube which forms the controlled volume 3. The body 2 can either be the body itself which is to be investigated or a three-dimensional model of the body to be investigated. In each case, the volume of the body 2 is less than or smaller than the volume of the controlled volume 3.

FIG. 2b indicates the laser intersections produced by a laser 5 for the controlled volume 3. The propeller 2 positioned in the controlled volume 3 is driven, for example, by a motor, and air 4 to which scattered particles have been added flows over said propeller 2. To investigate the behaviour of the rotating body 2, that is to say the propeller, for example the angle of attack of the propeller blades or the rotational speed of the rotating propeller can be varied. Furthermore, the flow rate of the oncoming fluid 4 can be varied to investigate the behaviour of the body 2 at different wind speeds.

FIG. 3 shows a simple flow chart of a possible embodiment of the method according to the invention for determining a force F acting on a body 2.

After a starting step S0, first of all the body 2 to be investigated is arranged in a predetermined controlled volume 3 of a flow tunnel. As soon as the body 2 is in the controlled volume 3, the pressure sensor 11 detects a pressure distribution p (x, y) for each defining surface defining the controlled volume 3. At the same time, in step S2, a velocity field is detected for each defining surface of the controlled volume 3 by means of the laser 5 and the cameras 6A, 6B. In a further step S3, the force acting on the body 2 is calculated by the calculation unit 10 as a function of the pressure distributions and velocity fields detected for the defining surfaces of the controlled volume, and is output to a user via an interface.

In a possible embodiment of the method according to the invention, the size or volume of the controlled volume 3 can be adjusted. The greater the controlled volume 3, the smaller the contribution of the forces detected by the pressure sensor 11, so that rapidly changing unstable forces, such as turbulence, can be detected relatively easily.

The forces and torques can be calculated independently based on the velocities occurring on the defining surfaces or control surfaces of the controlled volume 3.

In a possible embodiment, symmetries of the body 2 can also be considered in order to reduce the number of defining surfaces to be evaluated of the controlled volume 3 or to reduce the amount of data to be evaluated. For example, to investigate the behaviour of a single propeller on which air flows symmetrically, all that is required is the data of the defining surfaces arranged downstream of the propeller in the direction of flow and the data of a side face. Furthermore, the data of the defining surface arranged upstream of the propeller can be evaluated. Thus, the amount of data to be evaluated can be halved when the symmetry is considered.

The system 1 according to the invention allows an investigation of the body 2 on which air flows in respect of its forces F (t) which act thereon by an indirect measurement on defining surfaces of a controlled volume 3. Since the controlled volume 3 encompasses the body 2 in a specific spacing and the measurement is made indirectly, the forces acting on the body 2 are not affected by the measurement itself, in other words, the measuring system 1 according to the invention makes it possible to precisely measure the actual force distributions on the body 2 without falsification. Furthermore, in the measuring system 1 according to the invention, no sensors have to be fitted to the body 2 itself, so that the technical complexity for obtaining measured data is low, particularly in the case of rapidly rotating bodies 2. The measuring system 1 according to the invention, as shown in FIG. 1, allows an engineer to make reliable observations about the behaviour of the body 2 under various conditions. In this manner, the user, for example an engineer can optimise the flow behaviour of a body 2 based on the analysis results. Using the measuring system 1 according to the invention, it is not only possible to visualise for example the forces and torques which act on the body 2 to be investigated, but also the influence of the flow thereon. The measuring system 1 according to the invention also makes it possible to investigate temporal changes in the forces and torque distributions, i.e. dynamic force changes F (t) or torque changes can also be detected when parameters are changed, for example the oncoming flow rate. Furthermore, the measuring system 1 according to the invention is extremely flexible, because the controlled volume 3 is virtual and the coordinates of its defining surfaces can be easily adapted to the shape and size of the body 2 to be investigated. In addition to the controlled volume 3, further measurement parameters can be adjusted, for example the oncoming flow rate of the fluid 4, the concentration of the added or admixed scattered particles and the respective size thereof. Furthermore, the frequency of the laser light and the resolution of the cameras 6A, 6B can be adjusted. In addition, the density or type of the fluid 4 can be selected. The measurement can be optimally adapted to the body 2 to be investigated and to the selected analysis by the measurement parameters.

LIST OF REFERENCE NUMERALS 1 measuring system
2 body
3 controlled volume
4 flow of fluid
5 laser
6A, 6B cameras
7 memory
8 data processing unit
9 synchronising control
10 calculation unit
11 pressure sensor

The invention claimed is:

1. A method for determining forces which act on a three-dimensional body, the method comprising:
    (a) in a flow tunnel, arranging the three-dimensional body in a predetermined closed controlled three-dimensional volume which has a plurality of defining surfaces;
    (b) at first and second measurement devices, simultaneously measuring a pressure distribution and a velocity field for each surface of the plurality of defining surfaces enclosing the closed controlled three-dimensional volume, respectively; and
    (c) at a calculation unit, calculating the forces acting on the three-dimensional body as a function of the pressure distributions and velocity fields measured simultaneously for each surface of the plurality of defining surfaces of the closed controlled three-dimensional volume.

2. The method according to claim 1, wherein the velocity fields are measured optically for the defining surfaces of the closed three-dimensional controlled volume.

3. The method according to claim 1, wherein the three-dimensional body is exposed in the flow tunnel to a flow of a fluid which contains scattered particles.

4. The method according to claim 3, wherein a laser light which is generated by a pulsed laser, a respective laser intersection is detected for the defining surfaces for detecting a particle distribution of the scattered particles in the respective defining surface.

5. The method according to claim 4, wherein particle distributions, recorded by the cameras, of the scattered particles are stored temporarily as images in a memory.

6. The method according to claim 5, wherein a local particle displacement vector is calculated by cross correlation of the detected particle distributions.

7. The method according to claim 6, wherein a velocity vector of the velocity field is calculated based on particle displacement vectors.

8. The method according to claim 1, wherein the pressure distributions for the defining surfaces of the closed controlled three-dimensional volume are measured by at least one pressure sensor which can be moved on one or more of the defining surfaces.

9. The method according to claim 1, wherein a force (F) acting on the three-dimensional body is calculated as follows:

$$F = \oiint_S (\rho \overline{V} \cdot d\overline{S}) \overline{V} + \oiint_S p \, d\overline{S}$$

wherein
V is a velocity vector,
S is a defining surface of the closed controlled three-dimensional volume,
p is a detected pressure, and
ρ is the density of the flow fluid.

10. The method according to claim 1, wherein the closed controlled three-dimensional volume is formed by a cube or cuboid with six defining surfaces or is formed by a tetrahedron with four defining surfaces.

11. The method according to claim 1, wherein the time characteristic of the forces F acting on the three-dimensional body is determined dynamically as a function of the current pressure distributions and velocity fields.

12. The method according to claim 1, wherein three forces and torques for the three-dimensional body are determined from at least the pressure distribution and the velocity field of each surface defining the closed controlled three-dimensional volume.

13. A system for determining forces which act on a three-dimensional body, the system comprising:
    (a) a closed controlled three-dimensional volume which is provided inside a flow tunnel and in which the three-dimensional body is arranged;
    (b) a first measurement device configured to measure a pressure distribution for each defining surface of the closed controlled three-dimensional volume;
    (c) a second measurement device configured to measure a velocity field for each defining surface of the closed controlled three-dimensional volume, wherein the first and second measurement devices simultaneously measure the pressure distribution and the velocity field for each defining surface of a plurality of defining surfaces of the closed controlled three-dimensional volume; and
    (d) a calculation unit for calculating the forces acting on the three-dimensional body as a function of the pressure distributions and velocity fields measured simultaneously for the calculation surfaces of the closed controlled three-dimensional volume.

14. The system according to claim 13, wherein the first measurement device comprises at least one pressure sensor which can be moved on one or more defining surfaces of the closed controlled three-dimensional volume.

15. The system according to claim 13, wherein the second measurement device produces a laser intersection for the detection of a particle distribution of scattered particles on the defining surface for each defining surface of the closed controlled three-dimensional volume.

16. The system according to claim 13, wherein the body is a 3D model, the volume of which is smaller than the closed controlled three-dimensional volume.

17. The system according to claim 13, wherein three forces and torques for the three-dimensional body are determined from at least the pressure distribution and the velocity field of each surface defining the closed controlled three-dimensional volume.

\* \* \* \* \*